Patented Apr. 9, 1935

1,996,911

UNITED STATES PATENT OFFICE 1,996,911

ABRASIVE

Karl Eisenmann, Ludwigshafen-on-the-Rhine, Erich Scholz, Leipzig, and Karl Wolf, Ludwigshafen-on-the-Rhine, Germany, assignors, by mesne assignments, to Unyte Corporation, New York, N. Y., a corporation of Delaware No Drawing. Original application March 18, 1933, Serial No. 661,572. Divided and this application April 24, 1933, Serial No. 667,610. In Germany March 26, 1932

5 Claims. (Cl. 51—280)

The present application is a division of our application Ser. No. 661,572, filed March 18, 1933.

The present invention relates to abrasives comprising condensation products of methylol compounds of urea.

It has already been proposed to condense urea or thiourea and aldehydes, especially formaldehyde, or dimethylol-urea or -thiourea or the products of high molecular weight obtained from the said methylol compounds in organic solvents containing free hydroxyl groups, if desired, with the exclusion of water to form resinous products, such processes being described for example in the specification No. 1,699,245 and in the British specifications Nos. 260,253, 261,029, 301,696 and 319,251. Furthermore, products obtained by condensation in the presence of water may be converted, although not in so simple a manner as that already described, into products of the same kind by subsequent heating with solvents containing hydroxyl groups. The condensation products thus prepared are readily soluble in organic solvents which contain free hydroxyl groups while they are difficultly soluble or insoluble in practically all other solvents, such as esters, ketones and hydrocarbons. This fact must always be borne in mind when employing the said condensation products together with other film-forming substances, as for example cellulose esters, for lacquers which contain not only solvents containing hydroxyl groups but also esters and, as diluents, hydrocarbons because too high a content of the said additional solvents or diluents may readily cause the urea-formaldehyde condensation products to flocculate. Furthermore, the said condensation products are not capable of forming solid solutions with fatty oils such as are frequently employed in the lacquer industries without the addition of a third substance acting as an assistant for dissolution, so that without an addition of the said kind the lacquers, which contain as film-forming constituents not only the condensation product but also a fatty oil, as for example linseed oil, wood oil or castor oil, yield after drying turbid films which consist of two phases, namely the solid condensation product and the fatty oil. In the application Ser. No. 499,122, filed November 11, 1930, a process for the manufacture and production of artificial masses is described which consists in condensing a urea with formaldehyde, or a methylol-urea, preferably with the addition of a small amount of acid or alkaline condensing agents, in the presence of organic substances containing a free hydroxyl group and at least one further reactive group, such as an additional hydroxyl or a halogen group, but substantially in the absence of water, and converting the reactive groups still present in the resulting ethers wholly or partially with organic compounds capable of forming an oxygen-containing group with the said reactive groups. Thus for example a hydroxyl-bearing ether of a methylol compound of urea or thiourea with a polyhydric alcohol may be esterified with a carboxylic acid.

We have now found that new resinous condensation products which are readily soluble in non-alcoholic solvents, in particular in esters, ketones and hydrocarbons, as for example butyl acetate, toluene, oil of turpentine, and which are capable of forming solid solutions with fatty oils without the addition of an assistant for dissolution, can be obtained from methylol compounds of urea, that means condensation products obtainable from urea (including its homologues and derivatives, such as thiourea, N-methyl-urea, N-methyl-thiourea, mixtures of urea with such substances, and mixtures of such substances with each other) with formaldehyde or its polymers such as paraformaldehyde or polyoxymethylene, such as methylol urea, methylol thiourea, dimethylol urea, dimethylol thiourea, the amorphous products of high molecular weight obtainable from the said methylol compounds by splitting off water, or the alkyl ethers of the said dimethylol compounds, or of mixtures of these substances (all of which initial materials are to be regarded as equivalents for the purpose of the present invention), by subjecting the said initial materials to an acid condensation, i. e. in the presence of an acid condensing agent, in an alcoholic solvent, in the presence of a hydroxyl-bearing ester of a fatty acid containing at least 10 carbon atoms, i. e. such esters of aliphatic, saturated or unsaturated, carboxylic acids, which may also contain hydroxyl groups, with polyhydric alcohols, as for example ethylene glycol, glycerine, pentaerythritol and the like, as contain at least one free hydroxyl group in the alcohol radicle, and, after the condensation is completed, neutralizing the reaction mixture, expelling the solvent, and exposing the remaining resinous product to the action of high temperatures such as between about 80° and about 130° C., preferably between about 90° and about 100° C., until it has become soluble in non-alcoholic solvents. This heating should preferably not last longer than about 6 hours.

The said acid condensing agents comprise for example inorganic acids such as phosphoric, sulphuric, nitric or chlorhydric acids, organic acids such as carboxylic acids such as formic, acetic or oxalic acids, organic sulphonic acids such as benzene sulphonic acid, and substances yielding acids under the working conditions, for example carboxylic acid anhydrides such as acetic anhydride, or urea nitrate. The quantity of acid condensing agent necessary for the condensation depends on the nature of the initial material, the working temperature and the kind of the acid agent chosen; it may easily be ascertained in each case by a preliminary test. Usually a quantity of acid condensing agent is employed which allows the condensation to be carried out in the course of from 10 to 30 minutes at, say, between about 80° and about 100° C.; about 5 cubic centimeters of the reaction mixture are then mixed with about 25 cubic centimeters of di-ethyl ether and it is ascertained whether a pulverulent or slimy product precipitates; in this case the amount of acid agent is sufficient.

The acid condensation is generally carried out by heating to between about 50° and about 150° C., preferably between about 80° and about 100° C. The said condensation may also be carried out in a closed vessel, i. e. at superatmospheric pressure depending on the solvent employed. The said alcoholic solvents comprise for example methanol, ethanol, propanol, isopropanol, butanol, isobutanol, amyl alcohol, pentanol-1, methyl-3-butanol-1, methyl-2-butanol-1, ethylene glycol mono-alkyl or aryl ethers, or benzyl alcohol, and the like.

The said fatty acid esters of polyhydric alcohols comprise for example the hydroxyl-bearing esters of glycols, such as mono-, di- or tri-ethylene, -propylene, -butylene or -amylene glycol, hexylene glycols, polyglycols, glycerol, pentaglycerol, pentaerythritol, arabitol, or mannitol, with capric, lauric, palmitic, margaric, stearic, behenic, oleic, linoleic, linolenic, erucic, ricinoleic and elaeostearic acids, or of the mixtures of acids obtainable by the cleavage of fatty oils or fats, such as linseed, cotton, coconut, China wood and castor oils, tallow, train oils and the like. Mixtures of the said esters may also be employed. The employment of esters bearing 2 free hydroxyl groups, such as monoglycerides of the said fatty acids is especially advantageous; mixtures of mono- and diglycerides also prove very useful.

In order to obtain the desired effect, the amount of the said esters must be at least 50 per cent, preferably about 100 per cent, up to about 200 per cent, of the weight of the methylol compound employed, while the amount of the alcoholic solvent should be at least 50 per cent of the weight of the methylol compound, preferably not considerably less than the weight of the esters.

The process may be carried out for example as follows: When starting from urea and formaldehyde it is preferable to dissolve polymerized formaldehyde with the aid of a small amount of alkali in the alcohol in which the condensation is to be carried out, as for example butyl alcohol. The added alkali is then neutralized and the fatty acid ester containing free hydroxyl groups, in the presence of which the condensation is to be carried out, is dissolved therein together with a small amount of an acid reacting condensing agent, such as hydrochloric or formic acids, or urea nitrate. The reaction mixture is then heated to from 80° to 100° C. and the urea or thiourea is added in batches. When the addition thereof is completed, the reaction mixture is further heated for a short time and the solution is neutralized with alkali such as alkali metal, i. e. sodium, potassium, or lithium, hydroxide or carbonate, or also the corresponding compounds of the alkaline earth metals including magnesium, such as those of barium, calcium or strontium, or alkaline reacting compounds such as di- or tri-sodium or potassium phosphate.

Working with the corresponding dimethylol compounds is, however, simpler; after dissolving the fatty acid ester in the alcoholic solvent and adding the acid condensing agent, the solution is heated to from 80° to 100° C. and the dimethylol urea and/or dimethylol thiourea is introduced. The further stages of the condensation are then carried out as described.

The condensation product obtained in solution by either of the said methods still does not possess the desired properties, however. It is only soluble in alcoholic solvents and it is not compatible with fatty oils. If, however, after evaporating the solvent at atmospheric or reduced pressure the condensation product be further heated to from 90° to 110° C., preferably while stirring or kneading, it becomes readily soluble in solvents free from hydroxyl groups, as for example toluene, oil of turpentine or butyl acetate, and miscible with fatty oils. The small amount of volatile constituents formed during this further heating is preferably removed by employing an open vessel or a vacuum kneading machine in the heating operation.

The introduction of the fatty acid ester into the molecule of resinous condensation products, which is probably due to etherification or re-etherification, may also be effected, however, for example by subsequently heating a product which has been prepared in the presence of substantial quantities of a monohydric alcohol, such as butyl alcohol, and may be an ether as described in the specification No. 1,699,245, and is insoluble in hydrocarbons and the like, with fatty acid esters of the said kind and by prolonging the heating until the product has become soluble in non-alcoholic solvents.

The resinous condensation products obtained are solid, hard or soft and plastic, depending on the nature and amount of the fatty acid ester added, and usually pale yellow to brown in color, depending on the purity of the carboxylic acid, or ester thereof, employed. The resinous condensation products are soluble in non-alcoholic solvents such as aromatic hydrocarbons, for example in benzene, toluene, xylene, ethyl benzene and the like, in halogenated aliphatic hydrocarbons such as trichlorethylene, chloroform, in halogenated aromatic hydrocarbons, such as monochlorbenzene, in esters of aliphatic carboxylic acids, such as methyl, ethyl, butyl, propyl or amyl esters of formic, acetic or propionic acid, in cyclic ketones, such as cyclohexanone and cyclopentanone; the resinous products which are not condensed to a very high degree are usually also soluble in aliphatic and hydroaromatic hydrocarbons, such as benzine fractions, cyclohexane or tetrahydronaphthalene, and in open chain aliphatic ketones, such as acetone or methyl ethyl ketone. The resinous products are, moreover, generally soluble in alcohols, such as methyl, ethyl or propyl alcohols, but not in ethers. They may be converted by further heating at between about 80° and 150° C., preferably between about 90° and about 100° C., into the insoluble condition whereby also the hardness of the products is increased. This hardening process lasts about 15 hours if the heating is carried out between about 90° and about 100° C., and about 3 or 4 hours if the temperature is about 130° C. If the urea be replaced wholly or partly by thiourea, products are obtained which are softer than the analogous products prepared with urea solely. The products prepared with the aid of comparatively large quantities of urea are usually more tough and solid than those prepared from smaller quantities of urea which latter are more plastic and soft than the former.

The resins are suitable for use together with cellulose esters, as for example nitrocellulose, for the preparation of lacquers, the solvents and diluents for which may consist solely of esters, ketones and hydrocarbons. Such lacquers leave behind, after drying, lustrous highly elastic films having good adherence and resistance against water and after hardening at elevated temperatures, also against solvents. The lacquers obtained by dissolving the said condensation products together with drying oils, as for example linseed oil varnish, in oil of turpentine are distinguished, contrasted with ordinary linseed oil varnishes, in that they dry more rapidly and become hard very rapidly by heating to from 80° to 100° C.

The said condensation products are especially suitable as binding agents for particles of abrasive materials as for example granules of the different varieties of carborundum, corundum, glass or quartz powder, for the preparation of abrasive discs or abrasive paper, because after hardening at elevated temperature as stated above they have not only good waterproof properties but also the necessary tenacity, hardness and elasticity.

The following examples will further illustrate the nature of this invention but the invention is not restricted to these examples. The parts are by weight.

*Example 1*

250 parts of an ester derived from 1 molecular proportion of glycerine and 1 molecular proportion of the fatty acid mixture contained in linseed oil are dissolved at about 20° C. in a mixture of 300 parts of normal butyl alcohol and 50 parts of ethyl alcohol, 13 parts of a 5 per cent ethyl alcoholic solution of urea nitrate then being added. 250 parts of dimethylol urea are introduced while stirring into the solution warmed to 90° C. The dimethylol urea dissolves gradually with the formation of a solution of a resinous condensation product. During the condensation, which is carried out while stirring well, the temperature is kept at 90° C. After about 8 minutes a clear solution is obtained which is kept for about 12 minutes at 90° C. The solution is neutralized, while stirring, by the addition of 20 parts of tertiary sodium phosphate. The whole is then allowed to cool to room temperature and the phosphate which separates out is filtered off. The remainders of normal butyl alcohol together with the water formed during the reaction are expelled from the clear solution while working the whole in a vacuum kneading machine at a pressure of 80 millimeters (mercury gauge) and a temperature of 85° to 90° C. The remaining yellow brown resinous product, which is only soluble in alcoholic solvents, is further kneaded in the opened kneading machine for from about 3½ to 4 hours at 90° C., whereby the product becomes soluble in esters, ketones and hydrocarbons. The variation in the solubility properties of the product may be followed by withdrawing samples.

In order to prepare waterproof abrasive paper a 40 per cent solution of the said product in toluene is applied by means of rollers or with the aid of a spraying pistol to a strip of paper, grains of an abrasive material as for example carborundum, are strewed onto the paper strip coated with the resin and the latter is hardened, after evaporation of the toluene, between 90° and 150° C. for from about 3 to 15 hours depending on the flexibility and hardness desired for the abrasive paper.

*Example 2*

250 parts of a resin obtained by the condensation of dimethylol urea in butyl alcohol and freed from excess of solvent are dissolved in a finely ground condition in 300 parts of an ester derived from 1 molecular proportion of glycerine and 1 molecular proportion of ricinoleic acid while stirring or kneading at from 90° to 100° C., the solution then being heated to 100° C. for about 4 hours. The resulting product is soluble in esters, hydrocarbons and oil of turpentine and is eminently suitable as an addition to cellulose ester lacquers.

*Example 3*

300 parts of a mono-glyceride derived from 1 molecular proportion of glycerine and 1 molecular proportion of the fatty acid mixture contained in linseed oil are dissolved while stirring at from 90° to 100° C. in 600 parts of a 42 per cent solution of a urea-formaldehyde condensation product in butyl alcohol obtained from dimethylol urea, the free butyl alcohol then being distilled off in a suitable kneading machine at 80 millimeters (mercury gauge). The residue is then kneaded for from 3 to 4 hours at from 90° to 100° C. The resulting resin has the same properties as that obtained according to Example 1 but is somewhat more soft and plastic and thus yields more elastic products when used for the preparation of abrasive paper or abrasive discs.

*Example 4*

Formic acid is introduced into a mixture of 200 parts of butanol, 50 parts of ethyl alcohol and 150 parts of an aqueous 40 per cent solution of formaldehyde until the solution has a hydrogen-ion concentration of pH=3.5, the whole then being warmed to 90° C. While stirring, 50 parts of urea are added and then 150 parts of linoleic mono-glyceride, heating being continued for 15 minutes. The clear solution is rendered neutral with about 10 parts of tri-sodium phosphate, cooled to room temperature, filtered and then worked up as described in Example 1.

*Example 5*

250 parts of dimethylol urea are heated with 250 parts of isobutanol and 17.5 parts of an ethylalcoholic solution of urea nitrate of 5 per cent strength until complete dissolution, that means for from ½ to 1 hour. The solution is then neutralized by means of tertiary sodium phosphate and, each 400 parts of the neutralized solution are mixed with 200 parts of an esterification product prepared from 92 parts of glycerol and 280 parts of linoleic acid, the mixture being then heated for 4 hours to from 70° to 80° C. The isobutanol is then completely expelled by distillation and the remaining product is heated at 95° C. for 4 hours. The resulting resin is sticky and eminently suitable for the preparation of abrasive paper or abrasive discs.

What we claim is:—

1. Waterproof abrasives, comprising particles of a solid abrasive material and, as a binding agent therefor, a hardened resinous condensation product of a methylol compound of urea with a hydroxyl bearing ester of a fatty acid containing at least 10 carbon atoms, said condensation product having been rendered soluble in aromatic hydrocarbons and capable of forming solid solutions with fatty oils, without the addition of an assistant for dissolution, by a prolonged heating.

2. A waterproof abrasive disc, comprising particles of a solid abrasive material and, as a binding agent therefor, a hardened resinous condensation product of a methylol compound of urea with a hydroxyl bearing ester of a fatty acid containing at least 10 carbon atoms, said condensation product having been rendered soluble in aromatic hydrocarbons and capable of forming solid solutions with fatty oils, without the addition of an assistant for dissolution, by a prolonged heating.

3. A waterproof abrasive sheet, comprising a flexible, fibrous sheet coated with a hardened resinous condensation product of a methylol compound of urea with a hydroxyl bearing ester of a fatty acid containing at least 10 carbon atoms, said condensation product having been rendered soluble in aromatic hydrocarbons and capable of forming solid solutions with fatty oils, without the addition of an assistant for dissolution, by a prolonged heating and particles of a solid abrasive material fixed to said sheet by said coating.

4. Waterproof abrasive paper, comprising a paper strip coated with a hardened resinous condensation product of a methylol compound of urea with a hydroxyl bearing ester of a fatty acid containing at least 10 carbon atoms, said condensation product having been rendered soluble in aromatic hydrocarbons and capable of forming solid solutions with fatty oils, without the addition of an assistant for dissolution, by a prolonged heating and particles of a solid abrasive material fixed to said sheet by said coating.

5. Waterproof abrasives, comprising particles of a solid abrasive material and, as a binding agent therefor, a hardened resinous condensation product of a methylol compound of urea with a hydroxyl bearing ester of a fatty acid containing at least 10 carbon atoms, said condensation product having been rendered soluble in aromatic hydrocarbons and capable of forming solid solutions with fatty oils, without the addition of an assistant for dissolution, by a prolonged heating up to about six hours at a temperature between about 80° C. and about 130° C.

KARL EISENMANN.
ERICH SCHOLZ.
KARL WOLF.